Figure 1:
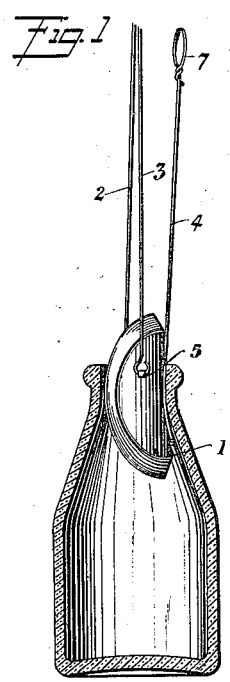

F. C. A. RICHARDSON.
CREAM SEPARATOR.
APPLICATION FILED NOV. 29, 1907.

950,117. Patented Feb. 22, 1910.

Witnesses:
A. Malsin
B. M. Couldock.

F. C. A. Richardson, Inventor
By his Attorney Lewis J. Doolittle

UNITED STATES PATENT OFFICE.

FRANK C. A. RICHARDSON, OF NEW YORK, N. Y.

CREAM-SEPARATOR.

950,117.  Specification of Letters Patent.  Patented Feb. 22, 1910.

Application filed November 29, 1907. Serial No. 404,263.

*To all whom it may concern:*

Be it known that I, FRANK C. A. RICHARDSON, a citizen of the United States, and resident of the city of New York, in the county of New York and State of New York, have invented certain new and useful Improvements in Cream-Separators, of which the following is a specification.

This invention relates to a device which is adapted to be inserted in a milk bottle for the purpose of manually separating the cream from the milk and permitting the cream to be poured out while the milk is retained by the device in the bottle.

In the embodiment of my invention shown I provide a suitable flexible diaphragm to which rods are attached in such a manner that the device may be easily placed in position in a bottle to accomplish the desired results.

The object of my invention is to provide a device for the purpose above set forth which shall be of simple and inexpensive construction not liable to get out of order.

In the accompanying drawing I have shown one embodiment of my invention in a simple device and in the several figures of the drawing like parts have been given similar reference numbers.

Figure 2:
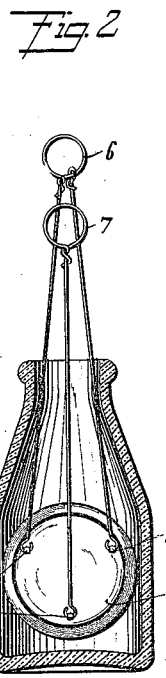
Figure 3:
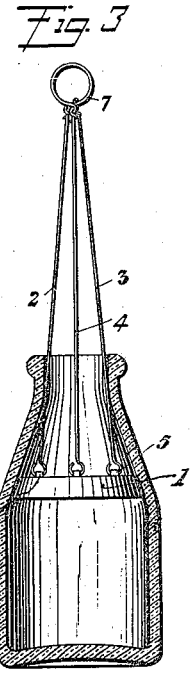
Figure 5:
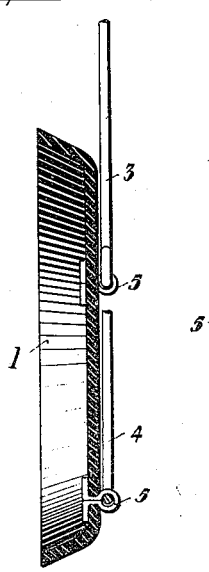
Figure 4:
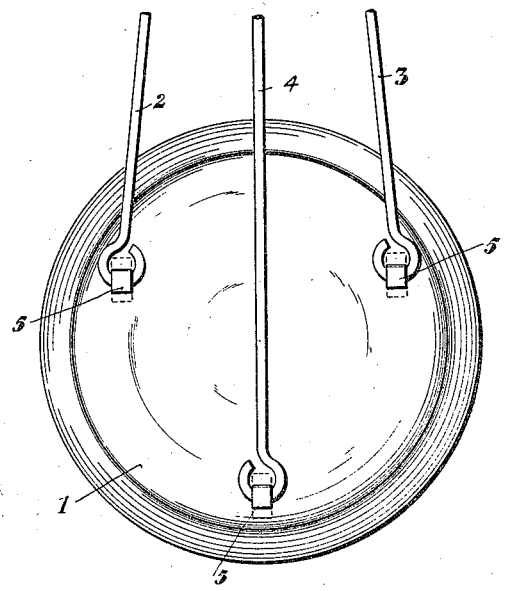
Figure 6:
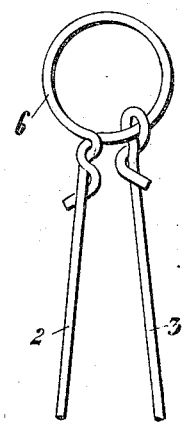

Figure 1 is a side elevation showing the device as the same is being inserted into the neck of the milk bottle. The bottle is shown in section. Fig. 2 is a view similar to Fig. 1 showing the device in its second position after having been inserted into the bottle. Fig. 3 is similar to Figs. 1 and 2 showing the device drawn up into position to separate the cream from the milk. Fig. 4 is an enlarged top plan view of the diaphragm. Fig. 5 is a sectional side elevation of Fig. 4. Fig. 6 is an enlarged view of the upper ends of the rods attached to the diaphragm.

At 1 is shown a circular flexible diaphragm which is preferably constructed of rubber or other suitable material. The outer edge of this diaphragm is curved or bent downwardly and flared outwardly, as shown in Fig. 5. The diameter of this diaphragm is somewhat less than the inside diameter of the bottle and on account of the flexible nature of the same closes the bottle when the device is drawn into position, as shown in Fig. 3.

As the level of the cream is practically uniform and as the milk bottles are substantially all of the same general shape, it is only necessary to regulate the diameter of the diaphragm so that the point at which the same will contact with the inside walls of the bottles corresponds to the point at which the cream floats upon the milk. Thus when the device is drawn into position shown in Fig. 3 the milk will be substantially all below the diaphragm and the cream all above the same and may be poured out, the milk being retained by the diaphragm in the bottle.

To manipulate and operate the diaphragm I have provided rods 2, 3 and 4 which are attached to the diaphragm 1 by hinged joints 5. These rods and hinged joints are preferably constructed of a non-corrosive material, such as aluminum. It will be noted that the hinged joints 5 permit the rods to swing in two directions only and that the points of attachment to the diaphragm are substantially equally spaced and positioned near the circumference. The object of this construction will be evident from the description of the operation of the device hereinafter given. The rods 2 and 3 are secured together at their upper ends and may be provided with a ring shaped portion 6, as shown in Fig. 6, to enable the same to be more easily manipulated. The rod 4 is also provided at its upper end with a ring shaped portion 7 for the same purpose. To use the device it is merely necessary to swing the rods 2, 3 and 4 to one side and fold or roll the diaphragm 1 so as to allow the same to be inserted through the neck of the bottle, as shown in Fig. 1. This is readily accomplished as the diaphragm is in one piece and constructed entirely of flexible material. The diaphragm should be dipped in water before inserting the same in the bottle in order to prevent the milk or cream from clinging to the same. It is desirable to make this diaphragm of rubber or other similar material on account of the fact that the water clings readily to the surface of rubber and forms a coating for the same.

As the device is lowered into the bottle below the level of the cream the diaphragm resumes its normal shape, as shown in Fig. 2. The rod 4 is then raised until its ring 7 registers with ring 6 of rods 2 and 3. This brings the diaphragm to its horizontal position and it is then raised to the position shown in Fig 3, separating the cream from the milk, and is retained in this position by reason of the frictional engagement between the flaring sides of the diaphragm and the walls of the bottle.

The object of providing a hinged joint for the rods 2, 3 and 4 such as described is for the purpose of more quickly and readily bringing the same into position and the object of joining two of the rods together at their upper end is for the purpose of rendering the operation of the device more simple and easily understood. It will be seen that with this arrangement it is only necessary to insert the device into the bottle as explained and then by bringing the two rings 6 and 7 together the diaphragm is turned and may at the same time be raised into position as described, thus doing away with any special manipulation or attention. This simplicity of operation is accomplished by reason of the arrangement of the rods and the construction and location of the hinged joints as described.

While in practice it has been found that three rods arranged as shown will accomplish the results it will, of course, be understood that any number desired may be used.

As many changes could be made in the above construction and many apparently widely different embodiments of my invention designed without departing from the scope thereof, I intend that all matter contained in the above description or shown in the accompanying drawing shall be interpreted as illustrative merely of an operative embodiment of my invention and not in a limiting sense.

What I claim is:

1. A cream separator comprising a flexible diaphragm and three rods attached thereto near its outer edge at points substantially equi-distant and arranged to manipulate said diaphragm.

2. A cream separator comprising a flexible diaphragm and three rods attached thereto near its outer edge at points substantially equi-distant, two of said rods being attached together at their upper ends and the third rod arranged to be operated in conjunction therewith to manipulate said diaphragm.

3. A cream separator comprising a flexible diaphragm and a plurality of rods attached thereto near its outer edge, two of said rods terminating at their upper ends in a common ring and a third rod also terminating at its upper end in a ring, said rods being of such a length that when said rings are brought together in register the diaphragm is brought into a horizontal position.

Signed at the city of New York in the county of New York and State of New York this 23d day of Nov. A. D. 1907.

FRANK C. A. RICHARDSON.

Witnesses:
LEWIS J. DOOLITTLE,
B. W. COULDOCK.